Patented June 27, 1944

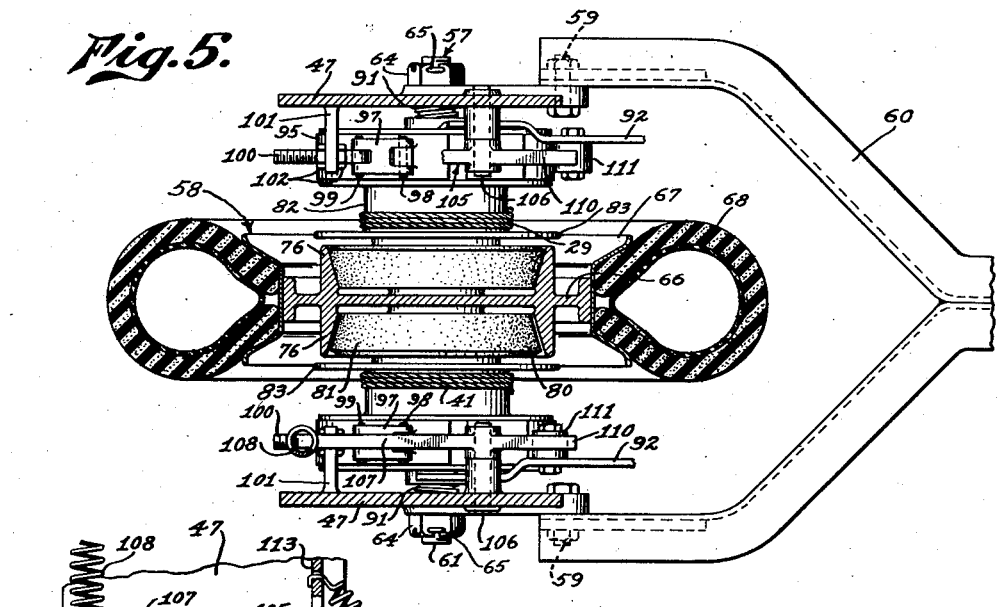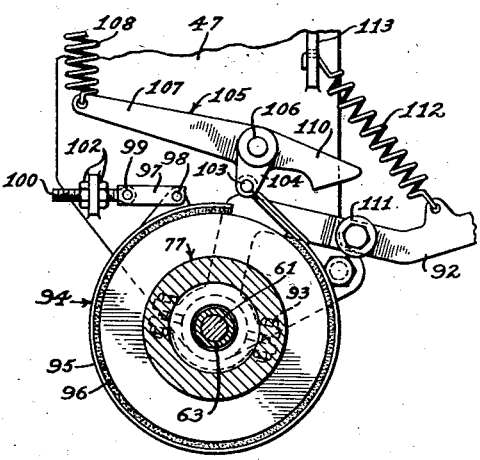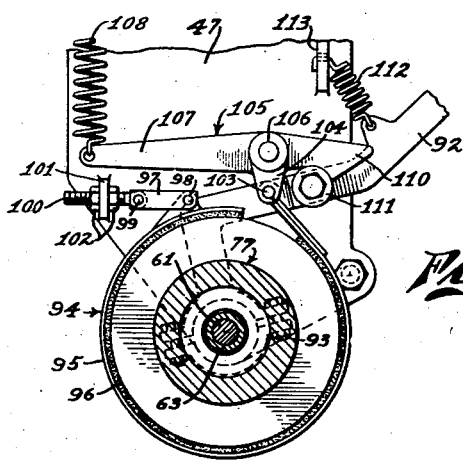

2,352,250

UNITED STATES PATENT OFFICE 2,352,250

TRACTION POWER OPERATED WINCH

Max M. Brodersen, Alhambra, Calif., assignor to The Slusser-McLean Scraper Company, Sidney, Ohio, a corporation of Ohio Original application May 27, 1940, Serial No. 337,466. Divided and this application June 22, 1942, Serial No. 447,908

7 Claims. (Cl. 254—166)

This invention relates to traction power operated winches for vehicles which are supported on wheeled carriages and are drawn over the ground surface by means of a tractor like, for example, the traction power operated scraper shown in my application for Letters Patent filed May 27, 1940, Serial No. 337,466, and since issued as Patent No. 2,301,516, the present application being a division of said earlier application.

The main object of my invention is to provide a wheeled carriage for a vehicle, said carriage having a cable winch incorporated therein which may be operated by traction as the vehicle is drawn over the ground surface, the entire winch mechanism being contained within said wheeled carriage, with cable means connecting said winch to any desired device for controlling its operation and with control means extending from said winch mechanism to the tractor operator's position for convenient manipulation.

Another object is to incorporate the cable winch in a wheeled carriage of the caster type and to arrange the cable means in such a manner that as the carriage swivels when the implement is making a turn the incidental movement of the cable is reduced to a minimum thus preventing undue disturbance of the cable setting for a given operation.

A further object is to provide a traction power operated winch which is compact, light in weight and capable of easy and instantaneous action to facilitate the controlling of its operation to a fine degree of accuracy yet is simple and rugged in construction thus reducing maintenance to a minimum.

With these and other objects in view, the invention consists in the combination, correlation, and construction of parts, members and features which will be described in the specification and will be finally pointed out in the claims.

Referring to the drawings:

Figure 5 is an enlarged section taken on line 5—5 in Figure 2.

Figure 6 is a section taken on line 6—6 in Figure 4 showing the neutral position of the brake and clutch control lever as used when the scraper is performing anyone of its various operations.

Figure 7 is a view similar to Figure 6 showing the brake and clutch control lever in the clutch operating position for transmitting traction power from the wheel to the cable drum for winding the cable.

Figure 8 is a view similar to Figure 6 showing the brake and clutch control lever in the brake releasing position for unwinding the cable from the drum.

Figure 1:
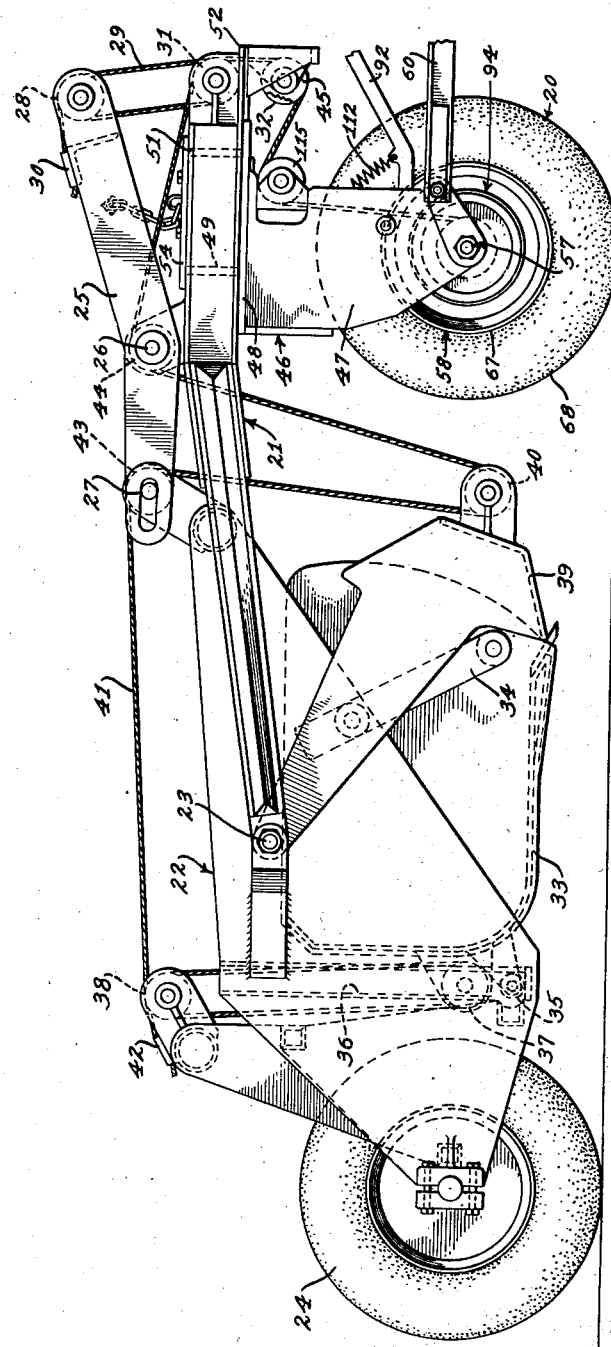
Figure 1 is a side elevation of an earth scraper embodying my invention.

The invention exemplified in the drawings in one of its practical forms of embodiment comprises a front wheeled carriage indicated generally at 20 in which is incorporated a traction operated cable winch adapted to control a scraper of the hauling type. It is understood however, that a traction operated winch of this invention may be used in any other type of vehicle in place of the usual engine or motor operated winch.

The scraper illustrated in the drawings comprises a front frame section generally indicated at 21 and a rear frame section indicated at 22, which are hingedly connected together by pivot pins 23. The front end of frame section 21 is supported on the front wheeled carriage 20 and the rear end of frame section 22 is supported on a rear wheeled carriage 24.

A lever mechanism is provided for raising and lowering the frame of the scraper at the hinge 23. Said mechanism includes a lever 25 pivotally mounted on the front frame section 21 as shown at 26. The rear end of the lever 25 is associated with the rear frame section 22 by a pin and slot connection 27 and the front end of lever 25 is provided with a pulley block 28. A cable 29, dead ended as at 30 on the lever 25, is reaved between pulley block 28 on the lever 25 and a pulley block 31 at the front of frame section 21 then passed through a swiveled pulley 32 and connected to a winch drum as will be described subsequently.

By imparting a pulling force to the cable 29 a block and tackle effect is obtained between the pulleys 28 and 31 which causes the lever 25 to impart raising movement to the scraper frame and by releasing cable 29 said frame is lowered by gravity.

A scraper bowl 33 is tiltably supported at its front end on the rear frame section 22 by means of a link 34 at each side thereof. The rear end of the bowl 33 is guided for vertical movement by means of a roller 35 at each lower rear corner of the bowl engaging a vertical channel 36 at each side of the frame structure 22. The rear end of bowl 33 is also provided with a pulley block 37 which is positioned directly below another pulley block 38 on the rear frame structure 22. A closure 39, for the receiving end of the bowl 33, is hinged on the frame pivot pins 23 and is provided with a pulley 40 at the front end thereof.

A cable 41, dead ended on the frame structure 22 as shown at 42, is reaved between the pulley block 38 on said frame structure and the pulley block 37 on the bowl 33, said cable is then passed over an idler pulley 43 at the front end of frame section 22, under the pulley 40 on the bowl closure 39, over another idler pulley 44 on the front frame section 21, over an idler pulley in the pulley block 37, then through a swiveled pulley 45 and connected to a winch drum as will be described hereinafter.

The opening and closing of the bowl closure 39 and tilting of the scraper bowl 33 is controlled by pulling or releasing the cable 41.

The wheeled carriage 20 is of the caster type and includes an inverted U shaped frame member 46 comprising a pair of spaced apart side members 47 which are secured at their upper ends to a cross member 48. The cross member 48 is a horizontal plate and is provided with a tubular spindle 49 which extends upwardly from the top of the cross member 48 and is journaled in a bearing 50 in the front end of the frame section 21. The bearing 50 is constructed by cutting out round holes in the upper and lower plates 51 and 52 respectively of said frame section and interposing between said upper and lower plates a tubular sleeve 53 which forms the wall of the bearing 50. A disk 54 is secured on the top of the tubular spindle 49 by means of bolts 55 passed through the disk 54 and cross member 48. The disk 54 and cross member 48 cooperate with the upper and lower plates 51 and 52 to serve as retaining flanges for the spindle 49. The side members 47 are reinforced by means of a transverse plate 56 welded to the rear edges of the side members 47 and to the underside of cross member 48, as may be seen in Figure 2.

The lower ends of side members 47 carry an axle 57 on which is journaled a wheel 58 which may be of any suitable type. However it is preferred to use a rubber tired wheel as illustrated in the drawings.

The wheel 58 is positioned to the rear of the vertical axis of the spindle 49 thereby effecting a caster like action in the carriage 20 to facilitate the trailing of the scraper behind a tractor.

Connected to the side members 47 of the carriage 20, as shown at 59, is a bifurcated hitch member 60 which is adapted for connection to a tractor in the usual manner.

Figure 4:
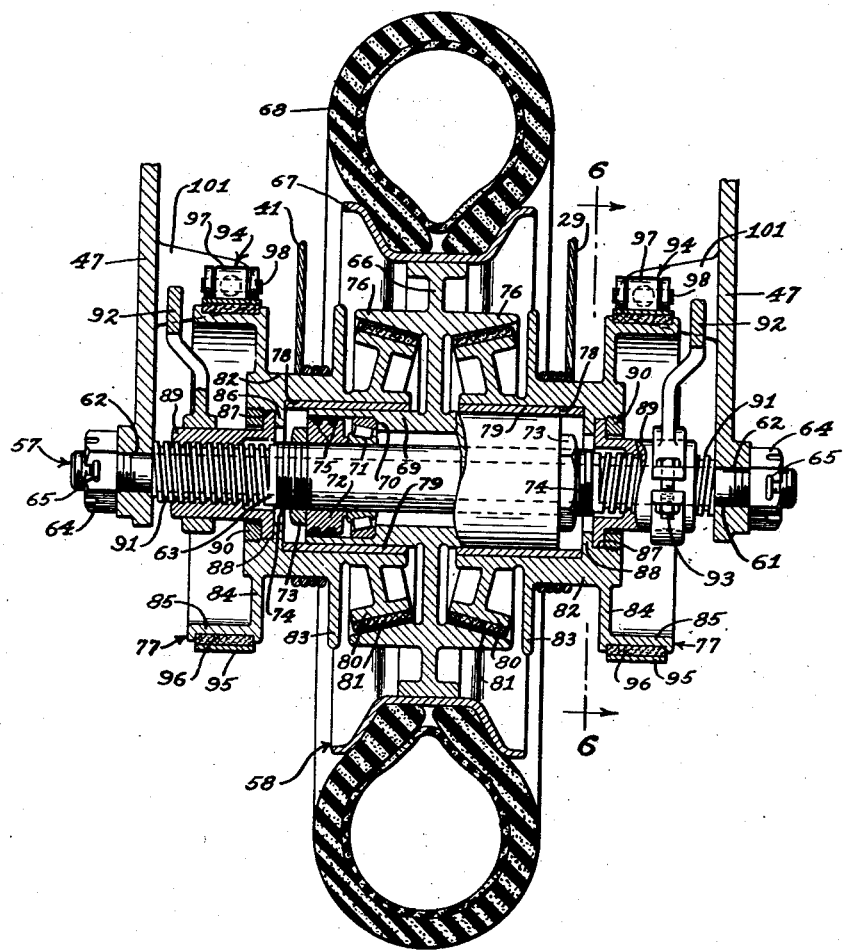
Figure 4 is an enlarged section taken on line 4—4 in Figure 2.

The axle 57 is stationary and comprises a shaft 61 supported in holes 62 at the lower ends of side members 47. A spacer sleeve 63 is mounted on the shaft 61 and is clamped securely between the side members 47 by means of nuts 64 which are screwed on the threaded ends of the shaft 61. The nuts 64 may be of the castellated variety so that they may be retained in the tightened position by means of the conventional cotter pins 65 (see Figure 4).

The wheel 58 includes a disk portion 66 carrying at the outer periphery thereof a tire rim 67 on which a pneumatic tire 68 is mounted in the usual manner.

The wheel disk 66 is provided with a hub 69 which extends outwardly from both sides of said disk. The hub 69 is counterbored at each end to provide retaining shoulders 70 for anti-friction bearings 71 which support the wheel 58 on the sleeve 63. Retainer rings 72 are positioned on the sleeve 63 to maintain the anti-friction bearings in place and said retainer rings 72 are held in position by means of nuts 73 which are screwed on the threaded portions 74 of the sleeve 63. The retainer rings 72 are grooved and provided with packing material, as shown at 75, to retain bearing lubricant and exclude dirt.

The wheel disk 66 is also provided, at each side thereof, with outwardly extending annular rims 76 in which the inner wall surface is of conical shape to cooperate with cone clutch elements which will be described subsequently.

Rotatably mounted on each of the two outwardly extending portions of the wheel hub 69 is a drum member 77. The hub portion of each drum member is bored out as at 78 and has a bushing 79, of anti-friction metal, pressed therein to facilitate rotation on the outer periphery of the hub 69.

Each of the two drum members 77 are provided, at the inner ends, with cone elements 80 which may be surfaced with suitable friction producing material, as indicated at 81. Each cone element 80 is adapted for engagement with the corresponding conical rim 76 on the wheel 58. The intermediate portion of each drum member 77 is provided with a cable drum 82 having inner and outer cable retaining flanges 83 and 84 respectively. The outer portion of each drum member is provided with a brake drum 85 which is an integral part of the outer cable drum flange 84.

The outer ends of the drum member's hubs are provided with inward flanges 86 which are counterbored as at 87 for rotatably engaging flanges 88 of sleeves 89. The flanges 88 are maintained within the counterbores 87 by means of threaded retainer rings 90. The sleeves 89 are provided with internal threads for engagement with threads 91 at the ends of the axle sleeve 63. The threaded sleeves 89 are also provided with operating handles 92 which are clamped to said sleeves as at 93 and extend forwardly toward the tractor for easy reach of the operator.

Associated with the brake drums 85 are brake mechanisms 94. Inasmuch as each of the two brake band mechanisms are identical in construction the following description will be directed to one of said mechanisms and similar parts in the other mechanism will be given the same reference numerals in the drawings.

The brake band mechanism 94 is of the self energizing type and includes a brake band 95 lined on the inner surface with conventional brake lining 96. The brake band 93 encircles a major portion of the brake drum periphery and is arranged so that the gap between the brake band ends is positioned at the top of the brake drum. The rear end of the brake band 93 is pivotally connected to the forward end of a horizontal link 97 as at 98. The rear end of the link 95 is pivotally connected as at 99 to an adjusting bolt 100 which is passed through a suitable hole in a lug 101 which extends inwardly from the side member 47. The bolt 100 is adjustably maintained in position by nuts 102 tightened against the opposite faces of the lug 101.

The front end of brake band 95 is pivotally connected as at 103 to a downwardly extending arm 104 of a bell crank lever 105. The bell crank lever 105 is pivotally mounted as at 106 on the inner face of the side member 47 and is provided with a rearwardly extending arm 107. A vertically positioned tension spring 108 is connected at its lower end to the rear end of the arm 107 and its upper end to a depending lug 109 on the bottom face of the cross member 48. The tension spring 108 normally maintains the brake band 95 tightened against the periphery of the brake drum 85. The bell crank lever 105 is provided with a forwardly extending pawl 110 adapted for engagement with a roller 111 mounted on the clutch control lever 92.

A tension spring 112 is connected at one end to the clutch control lever 92 and at the other end to an inwardly extending lug 113 on the side member 47. The spring 112 normally urges the clutch control lever 92 upwardly so that the roller 111 bears against the pawl 110 of the bell crank lever 105 (see Figure 6). The clutch control lever spring 112 is lighter in tension than the bell crank spring 108 which permits the roller 111 to bear against pawl 110 of the bell crank 105 without releasing the brake band 95.

Each of the side members 47 are provided with an inwardly extending bracket 114 which is positioned below the cross member 48 to provide space for swivelably mounting a pulley 115 between said bracket 114 and cross member 48. The pulley 115 is journalled on a shaft 116 supported in a bracket 117 which is provided with upper and lower trunnions 118 and 119 journalled in the cross member 48 and bracket 114 respectively, as may be observed in Figures 2 and 3.

Figures 2, 3:
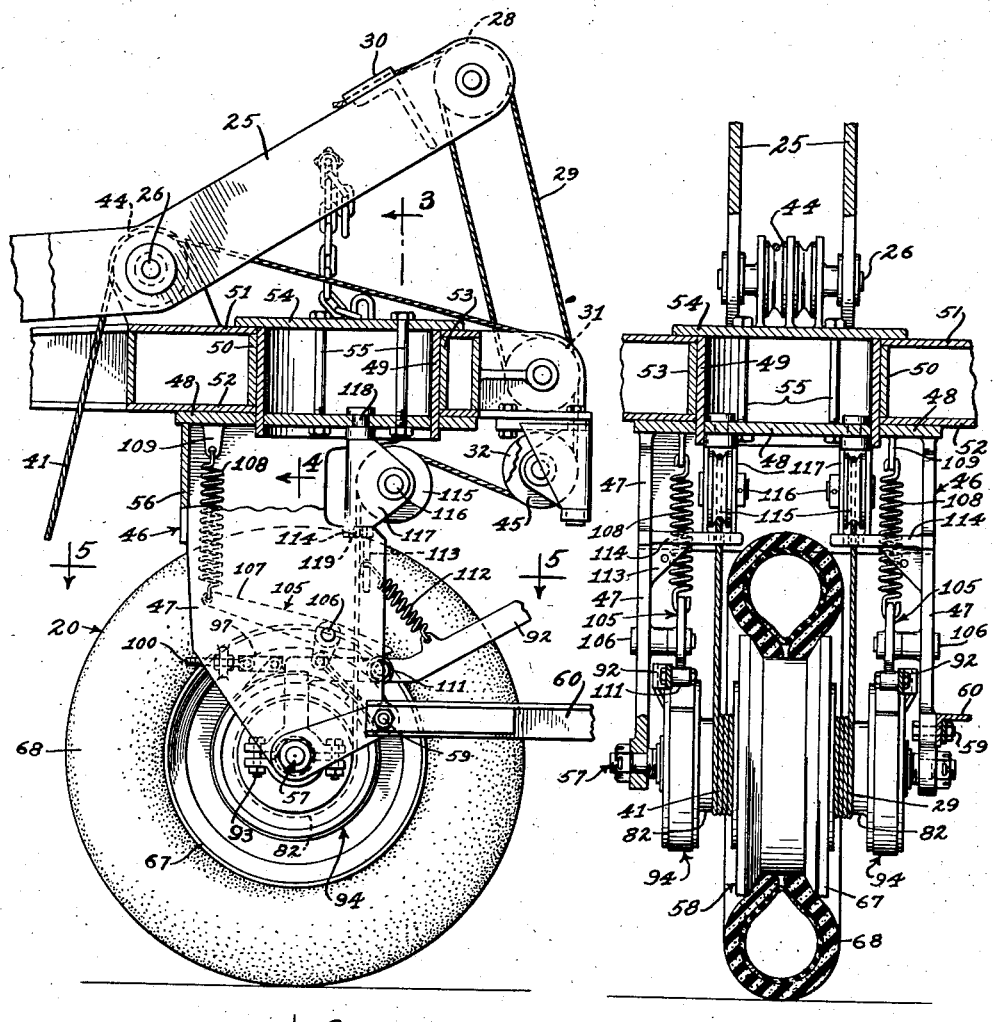
Figure 2 is an enlarged fragmentary side elevation, partly in section, of the front wheeled carriage showing the details of the traction operated winch.
Figure 3 is a section taken on line 3—3 in Figure 2.

The bowl and bowl closure controlling cable 41 is passed from the swiveled pulley 45, on the left side of the scraper as viewed in Figure 3, through the swiveled pulley 115 to the cable drum 82 on which it is wound when said drum rotates in the clockwise direction as viewed in Figure 2.

The frame raising and lowering cable 29 is passed from the pulley 32, on the right side of the scraper, through the swiveled pulley 115 to the cable drum 82 on which it is wound similar to the cable 41.

The two swiveled pulleys 115 are positioned near the vertical axis of the carriage swiveling spindle 49 so that pulling one cable and slacking the other is reduced to a minimum when the carriage swivels as the implement negotiates a turn. Thus reducing disturbance of the set position of the bowl to a minimum.

The operation of the traction power operated winch is as follows:

While the scraper is performing any one of its operations like, for instance, scraping or digging, load carrying, dumping, leveling, etc., the control levers 92 are held in the neutral position by the influence of the springs 112 which cause the rollers 111 on levers 92 to bear against the pawls 110, as illustrated in Figure 6. When the levers 92 are in this neutral position, the clutch cones 80 are out of engagement with the clutch rings 76 on the wheel 58 so that said wheel rotates freely on the axle sleeve 63. Due to the weight of the bowl and of the frame, cables 41 and 29 respectively, have a tendency to unwind from the cable drums. As the cables unwind the cable drums are rotated in the anti-clockwise direction, as viewed in Figure 6. The brake band mechanism 94 is self-energizing by the anti-clockwise rotation of brake drums 85 so that the brake bands 95 automatically tighten about the brake drums 85 thus preventing anti-clockwise rotation of the cable drums and thereby maintaining the bowl and the frame in the set position.

When it is desired to raise or tilt the scraper bowl the right or left lever 92 respectively, is pushed down as shown in Figure 7. The downward movement of lever 92 rotates the sleeve 89 which under the influence of the thread 91 on axle sleeve 63 pushes the drum member 77 inwardly until the clutch cone 80 engages the clutch ring 76 on the wheel 58, thus connecting the cable drum 85 with the wheel for clockwise rotation therewith as the scraper is drawn over the ground surface and thereby by virtue of winding the cable on the drum, the bowl is raised or tilted.

After the desired elevation or tilt of the bowl is obtained, the lever 92 is released to return to its neutral position thereby disconnecting the clutch and stopping the winding of the cable on the drum. When the cone clutch is released the cable drum has a tendency to rotate anti-clockwise by reason of the weight of the bowl or the frame and unwind the cable from said drum. This anti-clockwise rotation is instantaneously and automatically stopped immediately upon its inception by means of the self-energizing brake mechanism and thereby the bowl is maintained in its elevated or tilted position.

When it is desired to lower the scraper bowl or return it to the horizontal position, the right or the left lever 92 respectively is pulled up as shown in Figure 8. The upward movement of the lever 92 causes the roller 111 to raise the pawl 110 of the bell crank lever 105 thereby swinging said bell crank lever about pivot 106 in anti-clockwise direction, as viewed in Figure 8. This movement of the bell crank lever causes the arm 107 to swing forwardly thereby releasing the brake band 95 from engagement with the brake drum which permits the cable to unwind from the cable drum by reason of the weight of the frame or the bowl. As the bowl reaches the desired position, the winding of the cable is stopped by returning the lever 92 to the neutral position in Figure 6 where the brake band mechanism 94 acts to stop the rotation of the cable drum.

From the foregoing description it will be seen that I have provided by means of this invention a new and useful wheeled carriage for vehicles adapted to be drawn over the ground; that said wheeled carriage has incorporated therein a cable winch which derives its operating power from the rotation of the wheel as the vehicle is drawn over the ground surface; that the traction power may be directed conveniently and with a high degree of accuracy to any desired instrumentalities for controlling their operation, by the operator of the tractor; and that a vehicle equipped with this traction operated winch is a complete unit within its self and requires only a simple connection to a tractor for operation.

Having thus described my invention I claim:

1. In a vehicle adapted to be drawn over the ground surface, a carriage of the caster type for supporting said vehicle, wheel means in said carriage, a cable winch supported within said carriage, a cable wound on said winch, and means for selectively connecting said winch to the wheel means for winding said cable by the rotation of said wheel.

2. In a vehicle adapted to be drawn over the ground surface, a carriage of the caster type for supporting said vehicle and including wheel means, a cable winch supported within said carriage, a cable wound on said winch, brake means for said winch, common control means for selectively connecting said winch to the wheel means for winding the cable and for releasing said brake to unwind said cable.

3. In a vehicle adapted to be drawn over the ground surface, a swiveled wheeled carriage for supporting said vehicle, a traction power operated winch supported within said carriage, a cable wound on said winch, swiveled pulley means on said carriage for guiding the cable from said winch, said pulley means being arranged to reduce displacement of said cable to a minimum when said carriage swivels upon negotiating a curve.

4. In a vehicle supported on front and rear carriages to be drawn over the ground surface, said front carriage being of the caster type including a frame connected to the vehicle by means of a pivot having a vertical axis, a transverse axle mounted on said frame rearwardly of said vertical axis, a wheel mounted on said axle, a pair of traction operated cable winches aligned axially with said wheel and positioned one at each side thereof, a pair of swiveled pulleys mounted on said frame over which cables are passed from said winches, said swiveled pulleys being positioned near the vertical axis of the carriage pivot to reduce to a minimum the slacking or tightening of the cables when the vehicle is making a turn.

5. In a vehicle adapted to be drawn over the ground, a wheeled carriage of the caster type connected to said vehicle by means of a vertical pivot, a pair of traction operated cable winches supported in said carriage, a pair of swiveled pulleys mounted on said carriage over which cables are passed from said winches, said pulleys being positioned near the vertical axis of said pivot.

6. In a carriage for a vehicle adapted to be drawn over the ground, a traction operating winch comprising an axle, a wheel rotatably mounted on said axle, a pair of freely rotatable cable drums positioned one at each side of said wheel in axial alignment therewith and capable of longitudinal sliding movement on said axle, clutch means between the cable drums and the wheel engageable by sliding said cable drums toward said wheel, brake means for each cable drum activated by reverse rotation of said cable drums, a lever associated with each cable drum and brake means to control the engagement of said clutch means by sliding said drum toward the wheel for winding the cable drum and to disengage said brake for unwinding said cable drum.

7. In a vehicle adapted to be drawn over the ground, a carriage of the caster type for supporting said vehicle and including an axle, a wheel rotatably mounted on said axle, freely rotatable cable drum means positioned in axial alignment with said wheel and capable of longitudinal sliding movement on said axle, a clutch between the drum means and the wheel, a brake for said drum means activated by the reverse rotation thereof, a control lever associated with said drum means and said brake to impart sliding movement to the drum means for controlling the engagement of said clutch and for releasing said brake.

MAX M. BRODERSEN.